United States Patent
Lee et al.

(10) Patent No.: US 11,954,347 B2
(45) Date of Patent: Apr. 9, 2024

(54) MEMORY SYSTEM AND OPERATING METHOD THEREOF

(71) Applicant: SK hynix Inc., Icheon-si (KR)

(72) Inventors: Mi Hee Lee, Icheon-si (KR); Sung Jin Park, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 175 days.

(21) Appl. No.: 17/525,021

(22) Filed: Nov. 12, 2021

(65) Prior Publication Data

US 2022/0244852 A1  Aug. 4, 2022

(30) Foreign Application Priority Data

Feb. 2, 2021 (KR) .................. 10-2021-0014792

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ...... G06F 3/064; G06F 3/0604; G06F 3/0679; G06F 12/0246; G06F 2212/1016; G06F 2212/1032; G06F 2212/7203; G06F 2212/7208; G06F 1/30; G06F 3/0614; G06F 11/1402

See application file for complete search history.

(56) References Cited

U.S. PATENT DOCUMENTS

| | | | | |
|---|---|---|---|---|
| 2017/0286286 | A1* | 10/2017 | Szubbocsev | G06F 12/0246 |
| 2018/0151251 | A1* | 5/2018 | Oh | G06F 3/064 |
| 2019/0369908 | A1* | 12/2019 | Koo | G06F 3/0688 |
| 2021/0019080 | A1* | 1/2021 | Koo | G11C 11/5642 |
| 2021/0042201 | A1* | 2/2021 | Byun | G06F 3/0659 |
| 2021/0365200 | A1* | 11/2021 | Alwala | G06F 3/0604 |

FOREIGN PATENT DOCUMENTS

KR  20180041428 A  4/2018

\* cited by examiner

*Primary Examiner* — Francisco A Grullon
(74) *Attorney, Agent, or Firm* — Perkins Coie LLP

(57) ABSTRACT

A memory system includes a plurality of memory devices including first and second memory devices and a controller coupled to the plurality of memory devices to control operations performed on the plurality of memory devices. Each of the first and second memory devices includes a plurality of memory blocks, and memory blocks of the first and second memory devices form superblocks. The superblocks include a first superblock that includes memory blocks of the first and second memory devices and a second superblock that includes memory blocks of the first and second memory devices. The controller includes a first core unit and a second core unit configured to perform a first search operation and a second search operation, respectively, wherein the first and second search operations are performed in parallel.

17 Claims, 8 Drawing Sheets

MEMORY SYSTEM AND OPERATING METHOD THEREOF

CROSS-REFERENCES TO RELATED APPLICATION

This patent document claims the priority and benefits of Korean application number 10-2021-0014792, filed on Feb. 2, 2021, which is incorporated herein by reference in its entirety as part of the disclosure of this patent document.

TECHNICAL FIELD

The technology and implementations disclosed in this patent document generally relate to a memory system.

BACKGROUND

Memory systems are used to store information for use in a computer or related electronic devices. Memory systems may store data provided by a host device in response to a write request from the host device and provide stored data to the host device in response to a read request from the host device. The host device can be any electronic device that writes or reads data to or from a memory system, such as a computer, a digital camera, a mobile phone, etc. The memory system may be embedded in the host device or the host device may use an external memory system that is in communication with the host device.

SUMMARY

The technology disclosed in this patent document can be implemented in various embodiments to provide a memory system and an operation method of the memory system that can perform a recovery process upon the occurrence of an abnormal event such as a power failure.

In one aspect, a memory system is provided to include a plurality of memory devices including first and second memory devices and a controller coupled to the plurality of memory devices to control operations performed on the plurality of memory devices. Each of the first and second memory devices may include a plurality of memory blocks, and memory blocks of the first and second memory devices may form superblocks. The superblocks may include a first superblock that includes memory blocks of the first and second memory devices and a second superblock that includes memory blocks of the first and second memory devices. The controller may include a first core unit configured to perform a first search operation for searching for unstable memory region on the first superblock in the first memory device and a second core unit configured to perform a second search operation for searching for unstable memory region on the second superblock in the second memory device. The first search operation and the second search operation may be performed in parallel to search for unstable memory region in the first superblock of the first memory device and the second superblock of the second memory device, respectively.

In another aspect, a memory system is provided to include a plurality of nonvolatile memory devices; a first core unit configured to perform a first unstable memory region search operation on a first super block in a first nonvolatile memory device of the plurality of nonvolatile memory devices; and a second core unit configured to perform a second unstable memory region search operation on a second super block different from the first super block in a second nonvolatile memory device different from the first nonvolatile memory device among the plurality of nonvolatile memory devices, in parallel to the first core unit.

In another aspect, an operating method of a memory system is provided. The method includes performing a first search operation, by a first core unit of a controller in the memory system, on a first memory device in the memory system to discover a first unstable memory region of a first superblock and performing a second search operation, by a second core unit of the controller in the memory system, on a second memory device different from the first memory device to discover a second unstable memory region of a second superblock different from the first superblock. The first superblock may include memory blocks of the first and second memory devices, and the second superblock may include memory blocks of the first and second memory devices. The first search operation and the second search operation may be performed in parallel.

In another aspect, a memory system is provided to include a plurality of memory devices and a first core unit configured to manage a first superblock comprising memory blocks included in each of the plurality of memory devices. The first core unit may search for a first unstable memory region of the first superblock included in a first memory device of the plurality of memory devices, by performing a first search operation on the first superblock in the first memory device, and perform a recovery operation on a first candidate unstable memory region of the first superblock included in a second memory device. The first search operation may be not performed on the first superblock included in the second memory device, and the first candidate unstable memory region may be expected to be unstable based on the first unstable memory region.

The memory system and an operating method thereof according to embodiments can rapidly perform a recovery process on an abnormal power event.

DETAILED DESCRIPTION

The technology disclosed in this patent document can be implemented in some embodiments to provide a first core unit configured to perform in parallel a plurality of search operations for searching for unstable memory regions on different superblocks.

Hereinafter, some embodiments of the disclosed technology are described in detail with reference to the accompanying drawings.

Figure 1:
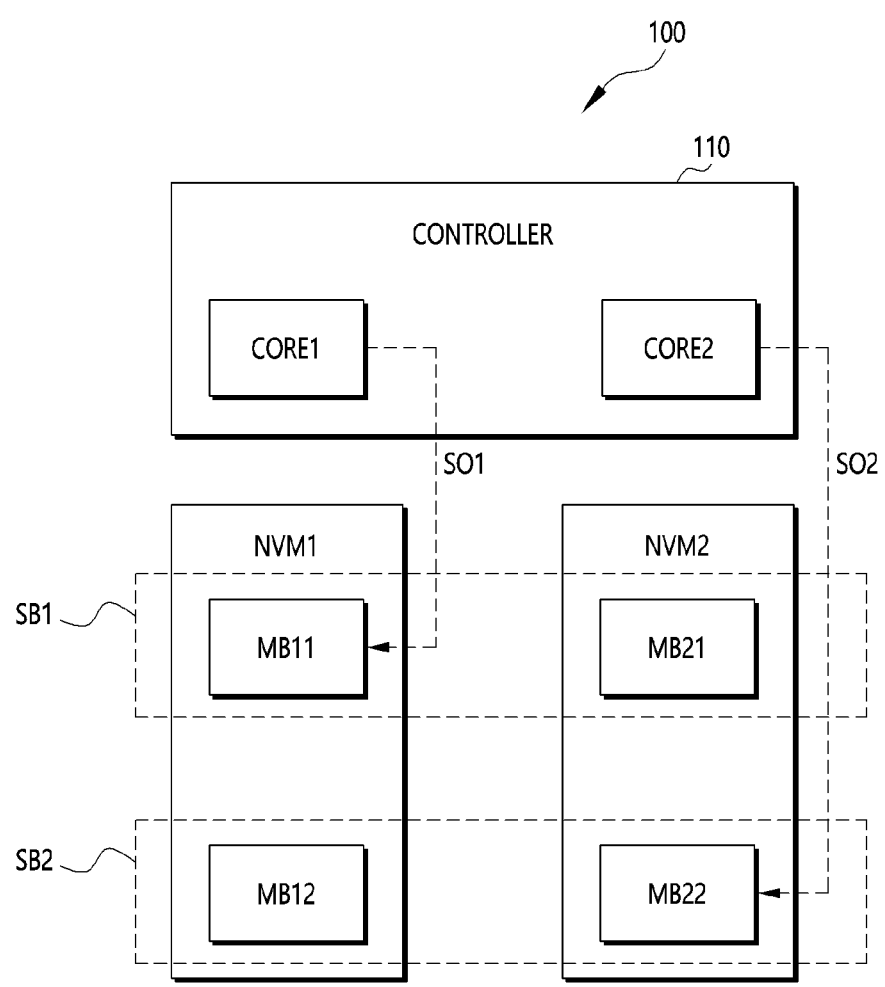
FIG. 1 is a block diagram illustrating an example of a memory system based on an embodiment of the disclosed technology.

FIG. 1 is a block diagram illustrating an example of a memory system 100 based on an embodiment of the disclosed technology.

The memory system 100 is in a host device or in communication with the host device to store data provided by the host device in response to a write request from the host device and provide stored data to the host device in response to a read request from the host device.

The memory system 100 may include a personal computer memory card international association (PCMCIA) card, a compact flash (CF) card, a smart media card, a memory stick, various multimedia cards (e.g., an MMC, an eMMC, an RS-MMC, and an MMC-micro), secure digital cards (e.g., an SD, a mini-SD, and micro-SD), a universal flash storage (UFS) or a solid state drive (SSD).

The memory system 100 may include a controller 110, a first nonvolatile memory device NVM1, and a second nonvolatile memory device NVM2.

The controller 110 may control an overall operation of the memory system 100. The controller 110 may control different memory devices in the memory system in parallel. For example, the controller 110 may control the first and second nonvolatile memory devices NVM1 and NVM2 to perform a foreground operation in response to an instruction from the host device. The foreground operation may include a write operation for writing data in the first and second nonvolatile memory devices NVM1 and NVM2 that is performed in response to a write request from the host device and a read operation for reading data from the first and second nonvolatile memory devices NVM1 and NVM2 that is performed in response to a read request from the host device.

The controller 110 may control the first and second nonvolatile memory devices NVM1 and NVM2 to perform a background operation that can be internally performed without any request from the host device. Examples of the background operation may include a wear leveling operation, a garbage collection operation, an erase operation, a read reclaim operation, and a refresh operation for the first and second nonvolatile memory devices NVM1 and NVM2. The background operation, like the foreground operation, may include an operation of writing data in the first and second nonvolatile memory devices NVM1 and NVM2 and reading data from the first and second nonvolatile memory devices NVM1 and NVM2.

The controller 110 may control the operations of the first and second nonvolatile memory devices NVM1 and NVM2 on a superblock basis. The superblock may be formed by combining a set of logical blocks over the first and second nonvolatile memory devices NVM1 and NVM2. For example, a first superblock SB1 may include a memory block MB11 of the first nonvolatile memory device NVM1 and a memory block MB21 of the second nonvolatile memory device NVM2. A second superblock SB2 may include a memory block MB12 of the first nonvolatile memory device NVM1 and a memory block MB22 of the second nonvolatile memory device NVM2. Although not illustrated, the controller 110 may further control operations that is performed on a plurality of superblocks for the first and second nonvolatile memory devices NVM1 and NVM2, in addition to or instead of the first and second superblocks SB1 and SB2.

FIG. 1 illustrates that each of the first and second superblocks SB1 and SB2 includes memory blocks consisting of one memory block from the first nonvolatile memory device NVM1 and one memory block from the second nonvolatile memory device NVM2, but each superblock may include memory blocks consisting of two or more memory blocks included in the first nonvolatile memory device NVM1 and two or more memory blocks included in the second nonvolatile memory device NVM2. For example, the first superblock SB1 may include a plurality of memory blocks having the same block address in the first nonvolatile memory device NVM1 and a plurality of memory blocks having the same block address in the second nonvolatile memory device NVM2. In another example, memory blocks in a superblock may have different block address from one another.

An open superblock among a plurality of superblocks may be a superblock that is being used to store data. The controller 110 may select a superblock to be used as an open superblock, among empty superblocks, and may sequentially store data in memory regions of the open superblock in a given order, for example, in order of word lines until the open superblock no longer includes an empty memory region. The controller 110 may perform a write operation only on an open superblock that is "open" when data is stored, and thus a write operation is not performed on a superblock that is not an "open" superblock. The controller 110 may store information regarding open superblocks in a given system region.

The controller 110 may simultaneously use a given number of open superblocks. For example, the controller 110 may simultaneously use different "open" superblocks in order to store different types of data. For example, the controller 110 may use the first superblock SB1 as a first open superblock in order to store, in the first superblock SB1, a mapping information between a logical address and a physical address, and may simultaneously use the second superblock SB2 as a second open superblock in order to store, in the second superblock SB2, data transmitted by the host device. In addition, the controller 110 may use a third open superblock in order to store data moved through a garbage collection operation.

For another example, the controller 110 may simultaneously use different open superblocks in order to store data by using different program methods. For example, the controller 110 may use the first superblock SB1 as a first open superblock in order to store data in the first superblock SB1 by using a single-level cell (SLC) program method, and may simultaneously use the second superblock SB2 as a second open superblock in order to store data in the second superblock SB2 by using a multi-level cell (MLC) program method. In addition, the controller 110 may use a third open superblock in order to store data by using a triple-level cell (TLC) program method.

When there is an abnormal event that causes a power failure, the controller 110 may perform a recovery process after the system is recovered from the power failure. For example, when it is determined that the power failure had occurred before a booting operation, the controller 110 may perform a recovery process. The abnormal event that causes a power failure may include a sudden power loss (SPL) and sudden power off (SPO). The abnormal event may include an event that causes an unstable power supply.

A recovery process of the controller 110 may include an operation for searching for an unstable memory region (hereinafter referred to as "unstable memory region search operation") and a recovery operation for an open superblock.

The unstable memory region search operation of the recovery process may be an operation for searching each memory block, included in an open superblock, for the memory region on which the last write (program) operation is performed before an abnormal event occurs (hereinafter referred to as an "unstable memory region"). An open superblock may include a plurality of memory blocks, and thus there may be a plurality of unstable memory regions in an open memory block. If data is written to such an unstable memory region of an open superblock, the data can be corrupted upon occurrence of an abnormal event that causes a power failure.

The recovery operation of the recovery process may be performed after the unstable memory region search operation. The recovery operation may include an operation for recovering nearly-corrupted data in each unstable memory region. For example, the recovery operation may include writing dummy data in a first subsequent memory region subsequent to an unstable memory region and copying the nearly-corrupted data from the unstable memory region to a second subsequent memory region subsequent to the first subsequent memory region, in each memory block of an open superblock. Here, the dummy data may indicate benign information that does not contain any useful data. In each memory block of the open superblock, the unstable memory region, the first subsequent memory region, and the second subsequent memory region may correspond to continuous word lines, respectively.

The controller 110 may include a first core unit CORE1 and a second core unit CORE2.

The first and second core units CORE1 and CORE2 may control the first and second nonvolatile memory devices NVM1 and NVM2 by performing operations in parallel. For example, the first and second core units CORE1 and CORE2 may perform the foreground operation and the background operation in parallel. For example, the first and second core units CORE1 and CORE2 may perform software operations such as firmware operations (e.g., operations associated with a flash translation layer (FTL)) in parallel.

The first and second core units CORE1 and CORE2 may perform, in parallel, first and second unstable memory region search operations SO1 and SO2 on different open superblocks of the first and second nonvolatile memory devices NVM1 and NVM2, respectively. For example, when the first and second superblocks SB1 and SB2 are open superblocks, the first core unit CORE1 may perform the first unstable memory region search operation SO1 on the memory block MB11 of the first superblock SB1 included in the first nonvolatile memory device NVM1. In parallel to the first unstable memory region search operation SO1, the second core unit CORE2 may perform the second unstable memory region search operation SO2 on the memory block MB22 of the second superblock SB2 included in the second nonvolatile memory device NVM2. The first unstable memory region search operation SO1 of the first core unit CORE1 and the second unstable memory region search operation SO2 of the second core unit CORE2 may be simultaneously performed because the first and second core units CORE1 and CORE2 can access the first and second nonvolatile memory devices NVM1 and NVM2 at the same time. As a result, a recovery process can be completed as quickly as possible because unstable memory regions of the first and second superblocks SB1 and SB2 different from each other are simultaneously searched for.

Furthermore, as will be described below with reference to FIG. 2, the first core unit CORE1 may search the first nonvolatile memory device NVM1 for a first unstable memory region of the first superblock SB1 through the first unstable memory region search operation SO1 and then perform a recovery operation on the first unstable memory region, and may also perform a recovery operation on a first candidate unstable memory region of the first superblock SB1 included in the second nonvolatile memory device NVM2. The first candidate unstable memory region may be a memory region that belongs to the memory block MB21 of the first superblock SB1 included in the second nonvolatile memory device NVM2. The address of a word line that is in the first nonvolatile memory device and coupled to the first candidate unstable memory region corresponds to the address of a word line that is in the same order in the second nonvolatile memory device and coupled to the first unstable memory region.

Likewise, the second core unit CORE2 may search the second nonvolatile memory device NVM2 for a second unstable memory region of the second superblock SB2 through the second unstable memory region search operation SO2 and then perform a recovery operation on the second unstable memory region, and may also perform a recovery operation on a second candidate unstable memory region of the second superblock SB2 included in the first nonvolatile memory device NVM1. The second candidate unstable memory region may be a memory region that belongs to the memory block MB12 of the second superblock SB2 included in the first nonvolatile memory device NVM1. The address of a word line that is in the second nonvolatile memory device and coupled to the second candidate unstable memory region corresponds to the address of a word line that is in the same order in the first nonvolatile memory device and coupled to the second unstable memory region. The first and second core units CORE1 and CORE2 may perform the recovery operations in parallel.

The first and second nonvolatile memory devices NVM1 and NVM2 may store data transmitted by the controller 110. The controller 110 may read the data from the first and second nonvolatile memory devices NVM1 and NVM2. The first and second nonvolatile memory devices NVM1 and NVM2 may be coupled to the controller 110 through channels or ways. In other words, the controller 110 may simultaneously access the first and second nonvolatile memory devices NVM1 and NVM2 in parallel through different channels or ways.

The first and second nonvolatile memory devices NVM1 and NVM2 may include a flash memory device such as a NAND flash or an OR flash, a ferroelectric random access memory (FeRAM), a phase-change random access memory (PCRAM), a magnetic random access memory (MRAM), a resistive random access memory (ReRAM), or others.

Although FIG. 1 illustrates the controller 110 as including first and second core units CORE1 and CORE2 by way of example, the controller 110 can include more than two core units. Furthermore, FIG. 1 illustrates the memory system 100 as including first and second nonvolatile memory devices NVM1 and NVM2 by way of example only, and thus the memory system 100 can include more than two nonvolatile memory devices.

Figure 2:
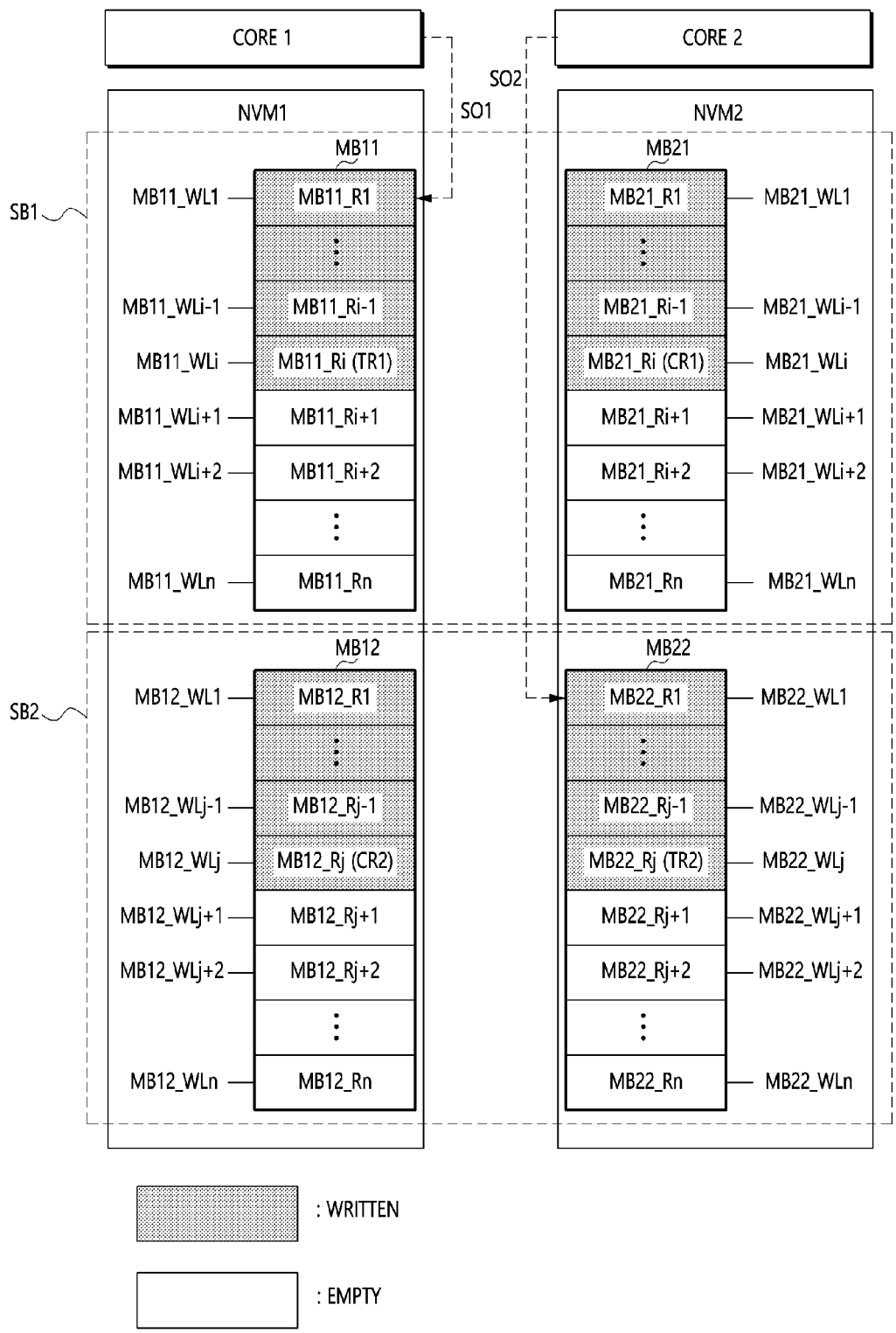
FIG. 2 is a diagram illustrating an example of how first and second cores of the memory system illustrated in FIG. 1 perform first and second search operations for unstable memory regions in the first and second cores, respectively.

FIG. 2 is a diagram illustrating an example of how the first and second core units CORE1 and CORE2 of the memory system illustrated in FIG. 1 perform the first and second unstable memory region search operations SO1 and SO2, respectively.

The memory block MB11 of the first superblock SB1 included in the first nonvolatile memory device NVM1 may include memory regions MB11_R1 to MB11_Rn corresponding to word lines MB11_WL1 to MB11_WLn, respectively. The first nonvolatile memory device NVM1 may access the corresponding memory regions by applying voltages to the word lines MB11_WL1 to MB11_WLn, respectively. The other memory blocks MB21, MB12, and MB22 may have configurations that are identical or similar to the memory block MB11.

Since the first and second nonvolatile memory devices NVM1 and NVM2 are coupled to the controller 110 through different channels or ways, the controller 110 may simultaneously control operations of different memory regions that belong to the memory blocks MB11 and MB21 of the first superblock SB1 and that correspond to word lines in the same order to store data in those memory regions. The memory region MB11_Ri of the memory block MB11 is the memory region on which the last write (program) operation is performed before an abnormal event occurs, and the memory region MB21_Ri of the memory block MB21 is the memory region on which the last write (program) operation is performed before the abnormal event occurs. The memory regions MB11_Ri and MB21_Ri may correspond to word lines in the same order, that is, i-th word lines MB11_WLi and MB21_WLi, respectively.

When the recovery process is performed, the first core unit CORE1 performs the first unstable memory region search operation SO1 on the memory block MB11 of the first superblock SB1 included in the first nonvolatile memory device NVM1, but does not perform the first unstable memory region search operation SO1 on the memory block MB21 of the first superblock SB1 included in the second nonvolatile memory device NVM2.

The first core unit CORE1 may perform the first unstable memory region search operation SO1 on the memory block MB11 by reading data from the memory regions MB11_R1 to MB11_Rn of the memory block MB11, respectively, and checking whether a corresponding memory region is empty based on the read data. The first core unit CORE1 may check whether a corresponding memory region is empty, starting from the first memory region MB11_R1 of the memory block MB11 corresponding to the first word line MB11_WL1, for example, but an embodiment of the present disclosure is not limited thereto.

The first core unit CORE1 may identify the memory region MB11_Ri on which the last write (program) operation is performed in the memory block MB11 before an abnormal event occurs, as a first unstable memory region TR1, through the first unstable memory region search operation SO1. In other words, the memory regions MB11_R1 to MB11_Ri−1 of the memory block MB1 before the first unstable memory region TR11 may store data. The memory regions MB11_Ri+1 to MB11_Rn of the memory block MB11 after the first unstable memory region TR1 may be empty.

In this case, although the first unstable memory region search operation SO1 is not performed on the memory block MB21, the memory region MB21_Ri corresponding to the word line MB21_WLi in the same order as the word line coupled to the first unstable memory region TR1 in the memory block MB11 may be considered to be a memory region on which the last write (program) operation is performed in the memory block MB21 before an abnormal event occurs. The memory region MB21_Ri may be a first candidate unstable memory region CR1 on which a recovery operation to be described later will be performed.

Likewise, when the recovery process is performed, the second core unit CORE2 may perform the second unstable memory region search operation SO2 on the memory block MB22 of the second superblock SB2 included in the second nonvolatile memory device NVM2, but may not perform the second unstable memory region search operation SO2 on the memory block MB12 of the second superblock SB2 included in the first nonvolatile memory device NVM1.

The second core unit CORE2 may perform the second unstable memory region search operation SO2 on the memory block MB22 by reading data from the memory regions MB22_R1 to MB22_Rn of the memory block MB22, respectively, and checking whether a corresponding memory region is empty based on the read data. The second core unit CORE2 may check whether a corresponding memory region is empty, starting from the first memory region MB22_R1 of the memory block MB22 corresponding to the first word line MB22_WL1, for example, but an embodiment is not limited thereto.

The second core unit CORE2 may search for the memory region MB22_Rj on which the last write (program) operation is performed in the memory block MB22 before an abnormal event occurs, as a second unstable memory region TR2, through the second unstable memory region search operation SO2. In other words, the memory regions MB22_R1 to MB22_Rj−1 of the memory block MB22 before the second unstable memory region TR2 may store data. The memory regions MB22_Rj+1 to MB22_Rn of the memory block MB22 after the second unstable memory region TR2 may be empty.

In this case, although the second unstable memory region search operation SO2 is not performed on the memory block MB12, the memory region MB12_Rj that belongs to the memory block MB12 and that corresponds to the word line MB12_WLj in the same order as the word line coupled to the second unstable memory region TR2 may be treated as a memory region on which the last write (program) operation is performed in the memory block MB12 before an abnormal event occurs. The memory region MB12_Rj may be a second candidate unstable memory region CR2 on which a recovery operation to be described later will be performed.

Figure 3:
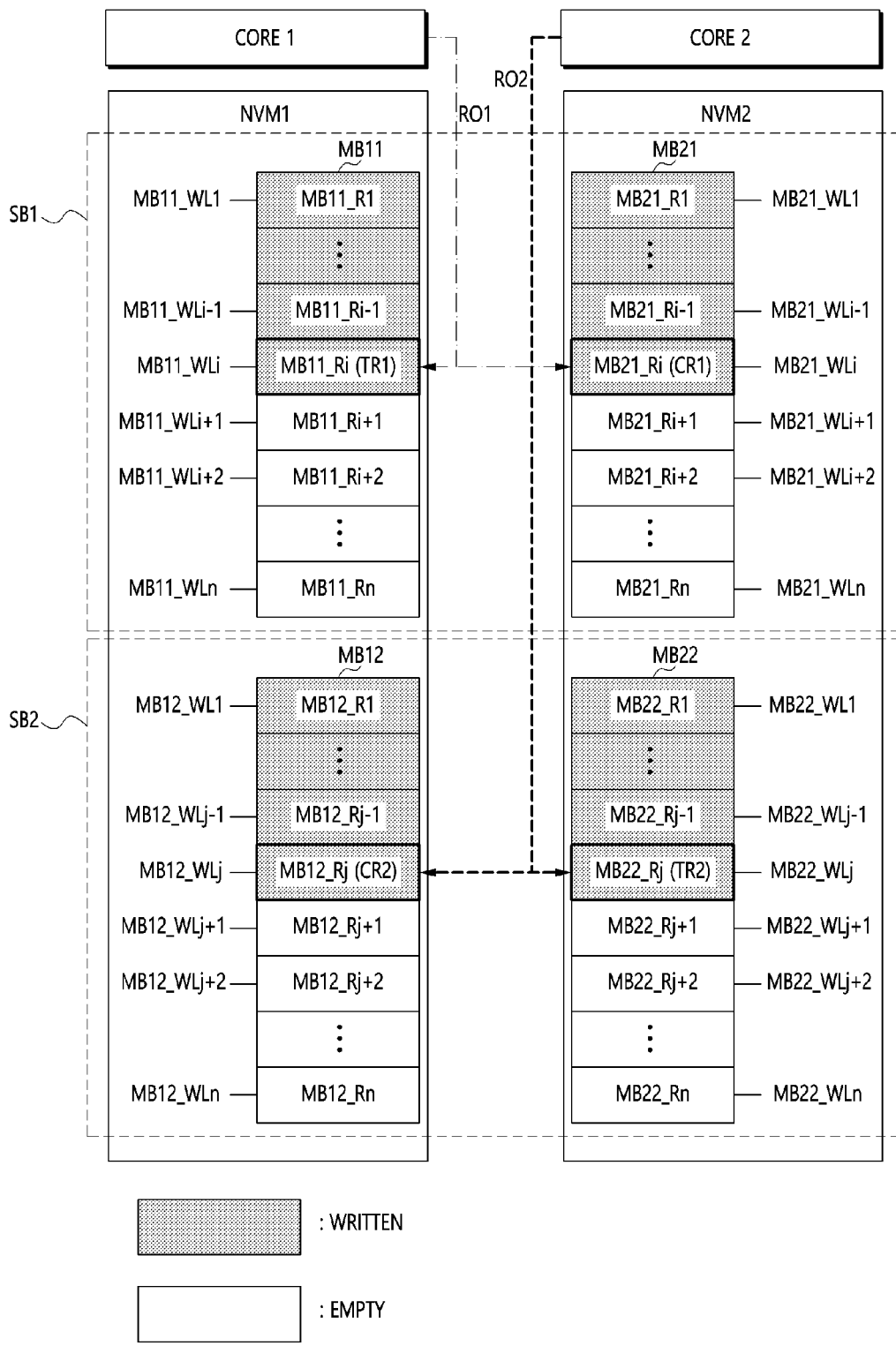
FIG. 3 is a diagram illustrating an example of how the first and second cores of the memory system illustrated in FIG. 1 perform recovery operations.

FIG. 3 is a diagram illustrating an example of how the first and second core units CORE1 and CORE2 of the memory system illustrated in FIG. 1 perform recovery operations RO1 and RO2, respectively.

The first core unit CORE1 may perform the recovery operation RO1 based on the first unstable memory region TR1 determined through the first unstable memory region search operation SO1. In some implementations, the first core unit CORE1 may perform the recovery operation RO1 on the first unstable memory region TR1 of the memory block MB11, and may also perform the recovery operation RO1 on the first candidate unstable memory region CR1 of the memory block MB21.

In some implementations, the first core unit CORE1 may perform the recovery operation RO1 on the first unstable memory region TR1 as follows. The first core unit CORE1 may write dummy data in the memory region MB11_Ri+1 subsequent to the first unstable memory region TR1 and write, in the memory region MB11_Ri+2 subsequent to the memory region MB11_Ri+1, data stored in the first unstable memory region TR1. The first unstable memory region TR1, the memory region MB11_Ri+1, and the memory region MB11_Ri+2 may correspond to the continuous word lines MB11_WLi, MB11_WLi+1, MB11_WLi+2, respectively. Likewise, the first core unit CORE1 may perform the recovery operation RO1 on the first candidate unstable memory region CR1 simultaneously with the recovery operation RO1 for the first unstable memory region TR1.

The second core unit CORE2 may perform the recovery operation RO2 based on the second unstable memory region TR2 determined through the second unstable memory region search operation SO2. In some implementations, the second core unit CORE2 may perform the recovery operation RO2 on the second unstable memory region TR2 of the memory block MB22, and may also perform the recovery operation RO2 on the second candidate unstable memory region CR2 of the memory block MB12. The second core unit CORE2 may perform the recovery operation RO2 in parallel and similarly to the recovery operation RO1.

When the memory system 100 of FIG. 1 includes a plurality of core units and a plurality of nonvolatile memory devices, a recovery process may be performed similarly to the aforementioned recovery process. In some implementations, the plurality of nonvolatile memory devices may be divided into a plurality of nonvolatile memory device groups that do not overlap each other. Furthermore, the plurality of core units may perform, in parallel, unstable memory region search operations on different superblocks included in the plurality of nonvolatile memory device groups. For example, the first core unit CORE1 may search a first nonvolatile memory device group for first unstable memory regions of a first superblock. The second core unit CORE2 may search a second nonvolatile memory device group for second unstable memory regions of a second superblock. A third core unit may search a third nonvolatile memory device group for third unstable memory regions of a third superblock.

The first core unit CORE1 may perform a recovery operation on the first unstable memory regions of the first superblock included in the first nonvolatile memory device group, and may also perform a recovery operation on first candidate unstable memory regions of the first superblock included in the second and third nonvolatile memory device groups. The first candidate unstable memory regions may be memory regions that belong to memory regions of the first superblock included in the second and third nonvolatile memory device groups and that correspond to word lines in the same order as the word lines coupled to the first unstable memory regions.

Furthermore, the second core unit CORE2 may perform a recovery operation on the second unstable memory regions of the second superblock included in the second nonvolatile memory device group, and may also perform a recovery operation on second candidate unstable memory regions of the second superblock included in the first and third nonvolatile memory device groups. The second candidate unstable memory regions may be memory regions that belong to memory regions of the second superblock included in the first and third nonvolatile memory device groups and that correspond to word lines in the same order as the word lines coupled to the second unstable memory regions.

Furthermore, the third core unit may perform a recovery operation on the third unstable memory regions of the third superblock included in the third nonvolatile memory device group, and may also perform a recovery operation on third candidate unstable memory regions of the third superblock included in the first and second nonvolatile memory device groups. The third candidate unstable memory regions may be memory regions that belong to memory regions of the third superblock included in the first and second nonvolatile memory device groups and that correspond to word lines in the same order as the word lines coupled to the third unstable memory regions.

Figure 4:
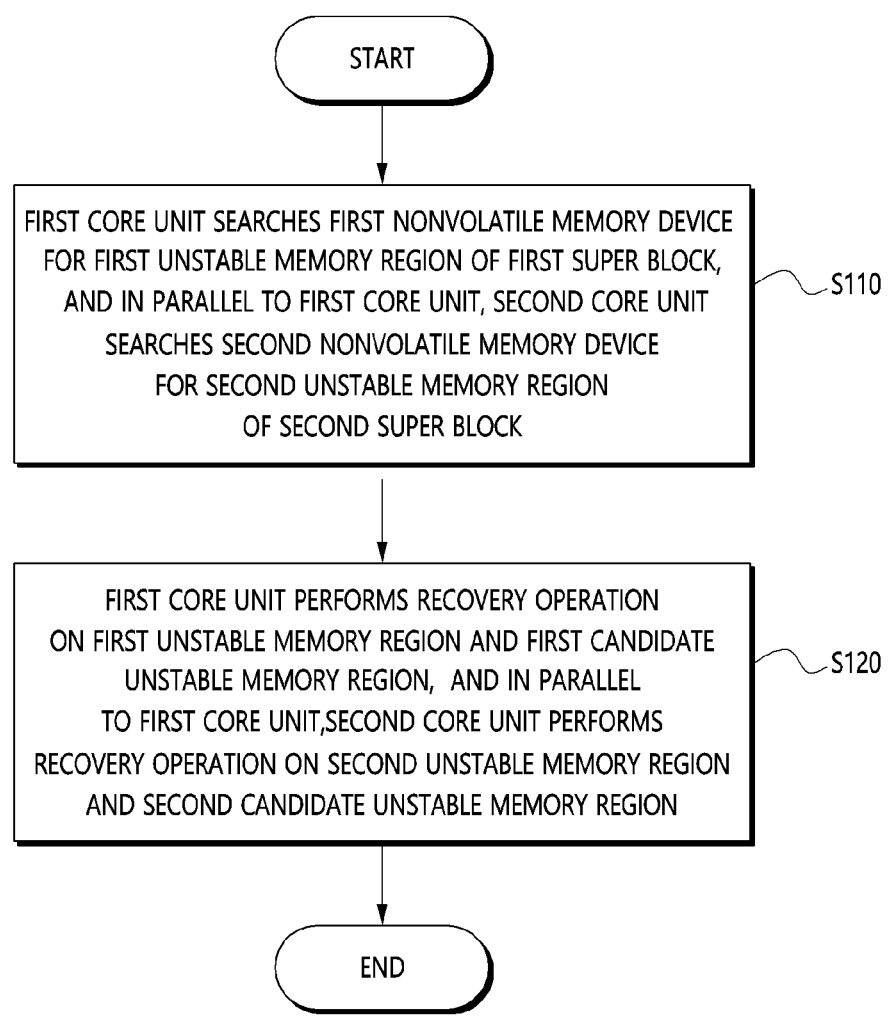
FIG. 4 is a flowchart illustrating an example of an operating method of the memory system of FIG. 1.

FIG. 4 is a flowchart illustrating an example of an operating method of the memory system 100 of FIG. 1.

Referring to FIG. 4, in step S110, the first core unit CORE1 may search the first nonvolatile memory device NVM1 for a first unstable memory region of the first superblock SB1, that is, a first open superblock. In parallel to the first core unit CORE1, the second core unit CORE2 may search the second nonvolatile memory device NVM2 for a second unstable memory region of the second superblock SB2, that is, a second open superblock.

In step S120, the first core unit CORE1 may perform a recovery operation on the first unstable memory region and a first candidate unstable memory region of the first superblock SB1 included in the second nonvolatile memory device NVM2. The second core unit CORE2 may perform a recovery operation on the second unstable memory region and a second candidate unstable memory region of the second superblock SB2 included in the first nonvolatile memory device NVM1. The first candidate unstable memory region may be a memory region that belongs to memory regions of the first superblock SB1 included in the second nonvolatile memory device NVM2 and that corresponds to a word line in the same order (e.g., in the word line address) as the first unstable memory region. The second candidate unstable memory region may be a memory region that belongs to memory regions of the second superblock SB2 included in the first nonvolatile memory device NVM1 and that corresponds to a word line in the same order (e.g., in the word line address) as the second unstable memory region.

Figure 5:
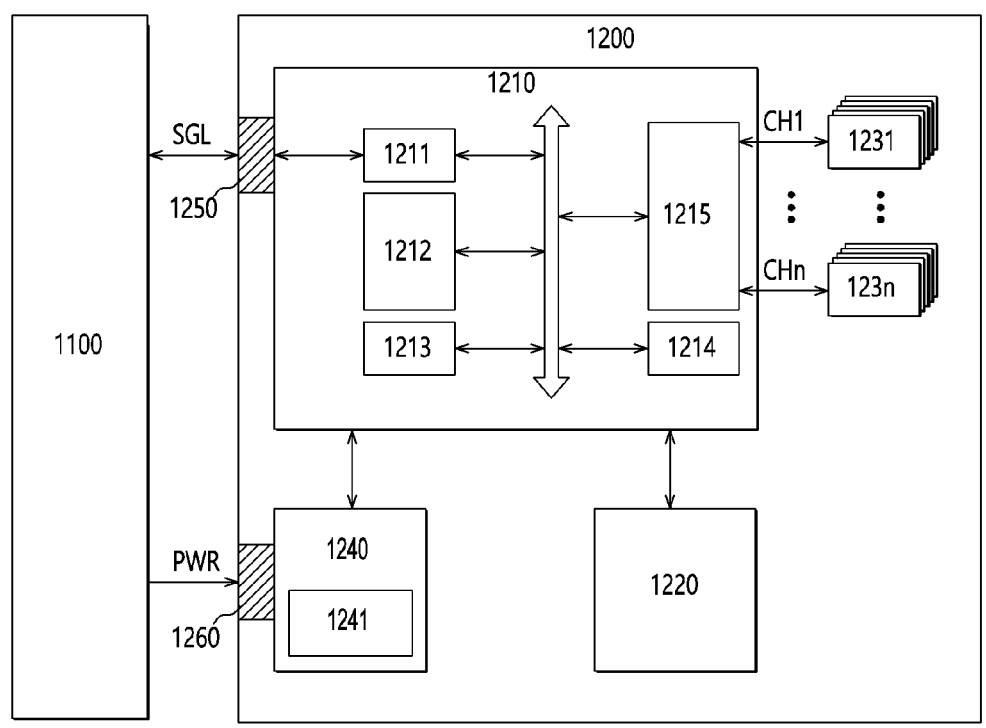
FIG. 5 is a diagram illustrating an example of a data processing system that includes a solid state drive (SSD) based on some embodiments of the disclosed technology.

FIG. 5 is a diagram illustrating an example of a data processing system 1000 that includes a solid state drive (SSD) 1200 based on some embodiments of the disclosed technology. Referring to FIG. 5, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The control unit 1212 may include the first core unit CORE1 and the second core unit CORE2 shown in FIG. 1.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 6:
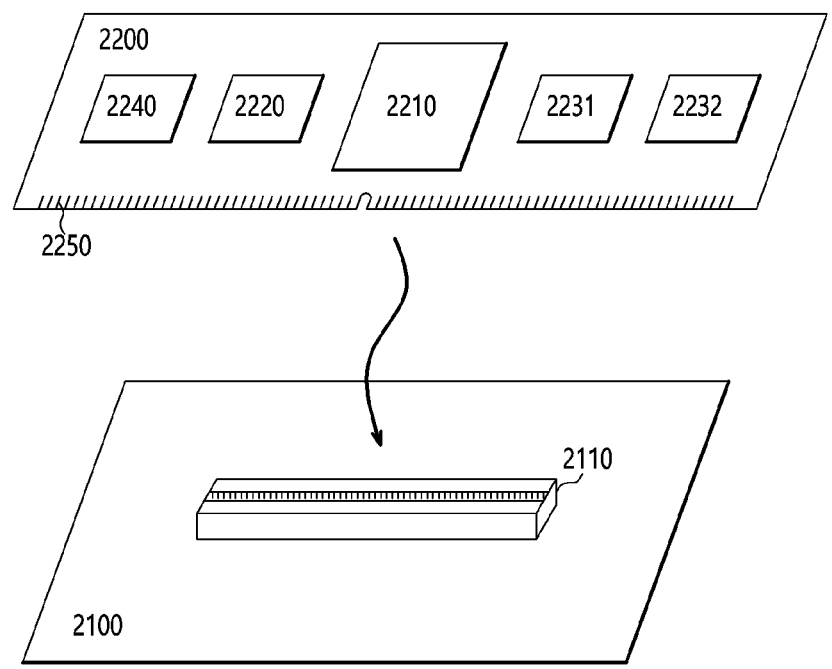
FIG. 6 is a diagram illustrating an example of a data processing system that includes a memory system based on some embodiments of the disclosed technology.

FIG. 6 is a diagram illustrating an example of a data processing system 2000 that includes a memory system 2200 based on some embodiments of the disclosed technology. Referring to FIG. 6, the data processing system 2000 may include a host device 2100 and the memory system 2200.

The host device 2100 may be configured in the form of a board such as a printed circuit board. Although not shown in the drawings, the host device 2100 may include internal circuitry for performing the function of a host device.

The host device 2100 may include a connection terminal 2110 such as a socket, a slot or a connector. The memory system 2200 may be mounted to the connection terminal 2110.

The memory system 2200 may include a printed circuit board. Examples of the memory system 2200 may include a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 5.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 based on control signals and commands provided by the controller 2210.

The nonvolatile memory devices 2231 and 2232 may be used as storage media of the memory system 2200.

The PMIC 2240 may provide the power received through the connection terminal 2250 to the circuitry inside the memory system 2200. The PMIC 2240 may be used for power management for the memory system 2200 according to control of the controller 2210.

The connection terminal 2250 may be coupled to the connection terminal 2110 of the host device 2100. Electrical signals that includes commands, addresses, and/or data may be transferred between the host device 2100 and the memory system 2200. The connection terminal 2250 may have various types depending on an interface scheme between the host device 2100 and the memory system 2200. The connection terminal 2250 may be disposed on any one side of the memory system 2200.

Figure 7:
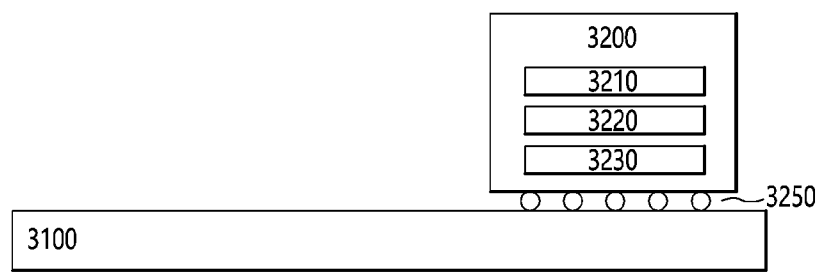
FIG. 7 is a diagram illustrating an example of a data processing system that includes a memory system based on some embodiments of the disclosed technology.

FIG. 7 is a diagram illustrating a data processing system 3000 that includes a memory system 3200 based on some embodiments of the disclosed technology. Referring to FIG. 7, the data processing system 3000 may include a host device 3100 and the memory system 3200.

The host device 3100 may include a printed circuit board. Although not shown in the drawings, the host device 3100 may include internal function blocks for performing the function of a host device.

The memory system 3200 may include a package that can be mounted to another device or system. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 5.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 8:
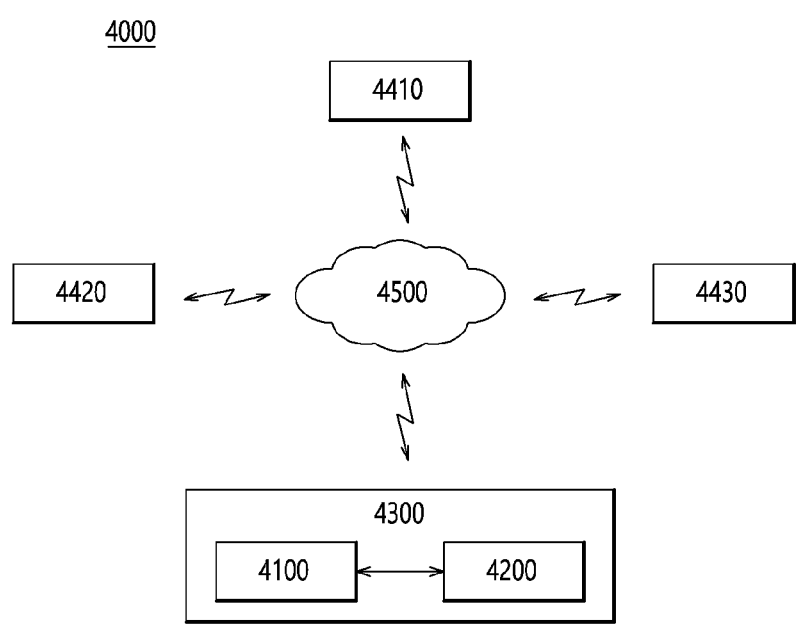
FIG. 8 is a diagram illustrating an example of a network system that includes a memory system based on some embodiments of the disclosed technology.

FIG. 8 is a diagram illustrating a network system 4000 that includes a memory system 4200 based on some embodiments of the disclosed technology. Referring to FIG. 8, the network system 4000 may include a server system 4300 and a plurality of client systems 4410 to 4430 which are coupled through a network 4500.

The server system 4300 may provide data in response to requests from the plurality of client systems 4410 to 4430. For example, the server system 4300 may store data provided from the plurality of client systems 4410 to 4430 or may provide data to the plurality of client systems 4410 to 4430.

The server system 4300 may include a host device 4100 and the memory system 4200. The memory system 4200 may include the memory system 100 shown in FIG. 1, the SSD 1200 shown in FIG. 5, the memory system 2200 shown in FIG. 6 or the memory system 3200 shown in FIG. 7.

Figure 9:
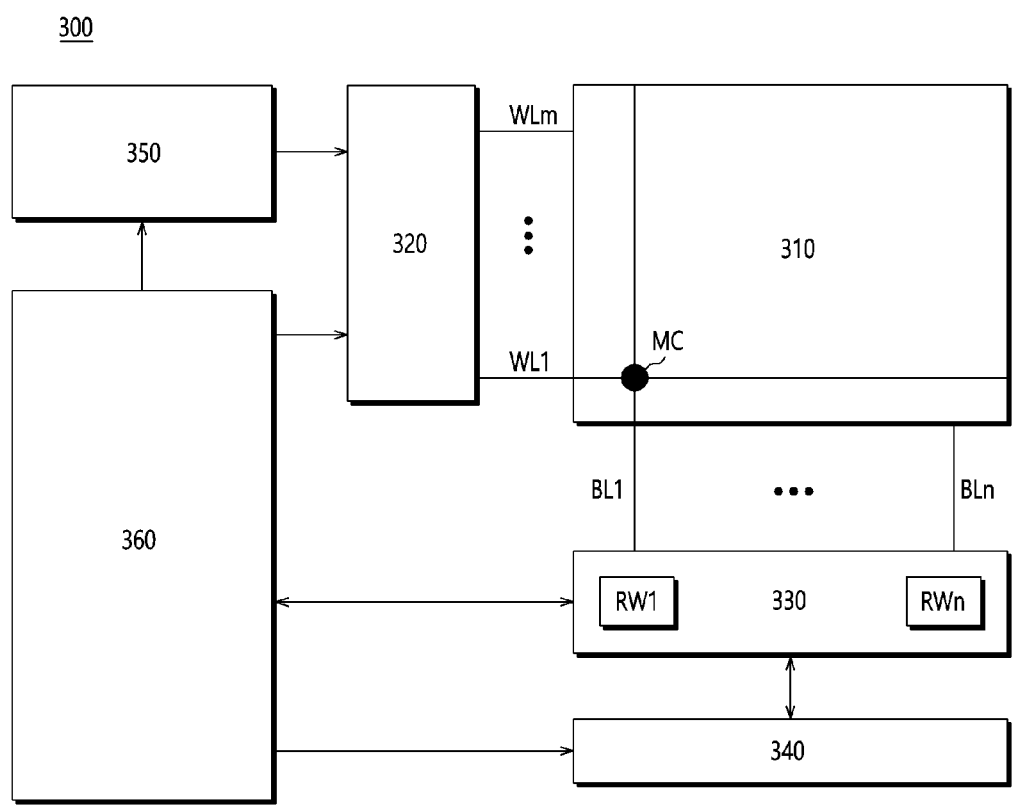
FIG. 9 is a block diagram illustrating an example of a nonvolatile memory device included in a memory system based on some embodiments of the disclosed technology."

FIG. 9 is a block diagram illustrating a nonvolatile memory device 300 included in a memory system based on some embodiments of the disclosed technology. Referring to FIG. 9, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate based on control signals and commands provided by the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate based on control signals and commands provided by the control logic 360. The data read/write block 330 may operate as a write driver or a sense amplifier depending on an operation mode. In an implementation, the data read/write block 330 may operate as a write driver which writes data provided from the external device to a memory cell in the memory cell array 310 during a write operation. In another implementation, the data read/write block 330 may operate as a sense amplifier which reads out data from the memory cell array 310 in a read operation.

The column decoder 340 may operate based on control and address signals provide by the control logic 360. The column decoder 340 may select a memory cell based on an address provided by the external device. The column decoder 340 may couple the read/write circuits RW1 to RWn of the data read/write block 330 respectively corresponding to the bit lines BL1 to BLn with data input/output lines or data input/output buffers, based on the address.

The voltage generator 350 may generate voltages to be used in internal operations of the nonvolatile memory device 300. The voltages generated by the voltage generator 350 may be applied to the memory cells of the memory cell array 310. In an implementation, a program voltage generated in a program operation may be applied to a word line of memory cells on which the program operation is to be performed. In another implementation, an erase voltage generated in an erase operation may be applied to a well area of memory cells on which the erase operation is to be performed. In another implementation, a read voltage generated in a read operation may be applied to a word line of memory cells on which the read operation is to be performed.

The control logic 360 may control general operations of the nonvolatile memory device 300, based on control signals provided by the external device. For example, the control logic 360 may control operations of the nonvolatile memory device 300 such as read, write and erase operations of the nonvolatile memory device 300.

The technical features disclosed in this patent document can be implemented in various configurations or ways and the disclosed embodiments are merely examples of certain implementations. Various and enhancements of the disclosed embodiments and other embodiments can be made based on what is disclosed and/or illustrated in this patent document.

What is claimed is:

1. A memory system comprising:
   a plurality of memory devices including first and second memory devices, wherein each of the first and second memory devices includes a plurality of memory blocks, and memory blocks of the first and second memory devices form superblocks, and wherein the superblocks include a first superblock that includes memory blocks of the first and second memory devices and a second superblock that includes memory blocks of the first and second memory devices; and
   a controller coupled to the plurality of memory devices to control operations performed on the plurality of memory devices, wherein the controller includes:
      a first core unit configured to perform a first search operation for searching for a first unstable memory region in a first memory block in the first memory device; and
      a second core unit configured to perform a second search operation for searching for a second unstable memory region in a second memory block in the second memory device,
   wherein the first search operation and the second search operation are performed in parallel,
   wherein the first unstable memory region is a memory region on which a last write operation is performed in the first memory block before an abnormal event occurs, and
   wherein the second unstable memory region is a memory region on which a last write operation is performed in the second memory block before the abnormal event occurs.

2. The memory system according to claim 1, wherein the first memory block is included in the first superblock, and wherein, the first core unit is operable to, when the first core unit discovers the first unstable memory region through the first search operation, perform a recovery operation on the first unstable memory region and a first candidate unstable memory region of the first superblock in the second memory device that is expected to be unstable based on the first unstable memory region.

3. The memory system according to claim 2, wherein the first candidate unstable memory region includes a memory region that belongs to the first superblock and is included in the second memory device, and wherein an address of a word line that is in the second memory device and coupled to the first candidate unstable memory region corresponds to an address of a word line that is in the first memory device and coupled to the first unstable memory region.

4. The memory system according to claim 1, wherein the second memory block is included in the second superblock, and wherein the second core unit is operable to, when the second core unit discovers the second unstable memory region through the second search operation, perform a recovery operation on the second unstable memory region and a second candidate unstable memory region of the second superblock in the first memory device that is expected to be unstable based on the second unstable memory region.

5. The memory system according to claim 4, wherein the second candidate unstable memory region includes a memory region that belongs to the second superblock and is included in the first memory device, wherein an address of a word line that is in the first memory device and coupled to the second candidate unstable memory region corresponds to an address of a word line that is in the second memory device and coupled to the second unstable memory region.

6. An operating method of a memory system, comprising:
performing a first search operation, by a first core unit of a controller in the memory system, on a first memory block in a first memory device in the memory system to discover a first unstable memory region in the first memory block; and
performing a second search operation, by a second core unit of the controller in the memory system, on a second memory block in a second memory device different from the first memory device to discover a second unstable memory region in the second memory block,
wherein the first search operation and the second search operation are performed in parallel,
wherein the first unstable memory region is a memory region on which a last write operation is performed in the first memory block before an abnormal event occurs, and
wherein the second unstable memory region is a memory region on which a last write operation is performed in the second memory block before the abnormal event occurs.

7. The operating method according to claim 6, wherein the first memory block is included in a first superblock, wherein the operating method further comprises, upon discovery of the first unstable memory region, performing, by the first core unit, a recovery operation on the first unstable memory region and a first candidate unstable memory region of the first superblock in the second memory device that is expected to be unstable based on the first unstable memory region.

8. The operating method according to claim 7, wherein the first candidate unstable memory region includes a memory region that belongs to the first superblock and is included in the second memory device, and wherein an address of a word line that is in the second memory device and coupled to the first candidate unstable memory region corresponds to an address of a word line that is in the first memory device and coupled the first unstable memory region.

9. The operating method according to claim 6, wherein the second memory block is included in a second superblock, wherein the operating method further comprises, upon discovery of the second unstable memory region, performing, by the second core unit, a recovery operation on the second unstable memory region and a second candidate unstable memory region of the second superblock in the first memory device, after the searching for of the second unstable memory region that is expected to be unstable based on the second unstable memory region.

10. The operating method according to claim 9, wherein the second candidate unstable memory region includes a memory region that belongs to the second superblock and is included in the first memory device, wherein an address of a word line that is in the first memory device and coupled to the second candidate unstable memory region corresponds to an address of a word line that is in the second memory device and coupled to the second unstable memory region.

11. A memory system comprising:
a plurality of memory devices; and
a first core unit configured to manage a first superblock comprising memory blocks included in each of the plurality of memory devices,
wherein the first core unit:
searches for a first unstable memory region of the first superblock, by performing a first search operation on a first memory block in a first memory device of the plurality of memory devices; and
performs a recovery operation on a first candidate unstable memory region of the first superblock included in a second memory device, wherein the first search operation is not performed on the second memory device, and wherein the first candidate unstable memory region is expected to be unstable based on the first unstable memory region, and
wherein the first unstable memory region is a memory region on which a last write operation is performed in the first memory block before an abnormal event occurs.

12. The memory system according to claim 11, wherein the first candidate unstable memory region includes a memory region that belongs to the first superblock and is included in the second memory device, and wherein an address of a word line that is in the second memory device and coupled to the first candidate unstable memory region corresponds to an address of a word line that is in the first memory device and coupled to the first unstable memory region.

13. The memory system according to claim 11, wherein the first core unit performs a recovery operation on the first candidate unstable memory region while performing the recovery operation on the first unstable memory region.

14. The memory system according to claim 11, further comprising a second core unit configured to perform a second search operation on a second memory block in the second memory device to discover a second unstable memory region of a second superblock different from the first superblock, wherein the first search operation and the second search operation are performed in parallel, and wherein the second unstable memory region is a memory region on which a last write operation is performed in the second memory block before the abnormal event occurs.

15. The memory system according to claim 14, wherein the second core unit does not perform the second search operation on the first memory device.

16. The memory system according to claim 14, wherein the second core unit performs a recovery operation on a second candidate unstable memory region of the second superblock included in the first memory device, and wherein the second candidate unstable memory region is expected to be unstable based on the second unstable memory region.

17. The memory system according to claim 16, wherein the second candidate unstable memory region includes a memory region that belongs to the second superblock and is included in the first memory device, and wherein an address of a word line that is in the first memory device and coupled to the second candidate unstable memory region corresponds to an address of a word line that is in the second memory device and coupled to the second unstable memory region.

* * * * *